United States Patent [19]

Gungor et al.

[11] Patent Number: 5,420,225
[45] Date of Patent: May 30, 1995

[54] ARAMID COMPOSITIONS OF IMPROVED SOLUBILITY AND FLAME RETARDANCY

[75] Inventors: Attila Gungor, Istanbul, Turkey; James E. McGrath, Blacksburg, Va.; Yadollah Delaviz, Blacksburg, Va.; Harry W. Gibson, Blacksburg, Va.

[73] Assignee: Virginia Tech Intellectual Properties, Inc., Blacksburg, Va.

[21] Appl. No.: 736,541

[22] Filed: Jul. 26, 1991

[51] Int. Cl.6 .............................................. C08G 79/02
[52] U.S. Cl. .................................... 528/168; 528/337; 528/340
[58] Field of Search ........................ 528/168, 337, 340

[56] References Cited

PUBLICATIONS

Angewandte Chemie; Internation Edition in English; vol. 28, No. 3; Mar. 1989; pp. 253–267.

*Primary Examiner*—John Kight, III
*Assistant Examiner*—Terressa Mosley
*Attorney, Agent, or Firm*—Richard P. Fennelly; Louis A. Morris

[57] ABSTRACT

Aramid polymers, e.g., those derived from p-phenylene diamine and terephthaloyl chloride, can have their solubility properties and flame retardancy enhanced by the incorporation therein of a moiety derived from a bis-(aminophenoxyphenyl) phosphine oxide, e.g., bis(3-aminophenoxy-4'-phenyl) phenylphosphine oxide.

3 Claims, No Drawings

ARAMID COMPOSITIONS OF IMPROVED SOLUBILITY AND FLAME RETARDANCY

BACKGROUND OF THE INVENTION

Aramid polymers (also termed "aromatic polyamides") have been found to have particular utility as high performance fibers due to their ability to be highly drawn or oriented and the ability of the materials to develop liquid crystalline phases and subsequent high stiffness and strength. On the other hand, these materials are difficult to process into either films or fibers due to lower than desired solubility characteristics. Among the various strategies for generally lowering the melting point of stiff-chain macromolecules may be listed the following: (1) insertion of flexible comonomer units ("spacers") like n-alkylene chains; (2) inclusion of bent units of different size; and (3) appending of flexible side chains onto the stiff main chains (see Angewandte Chemie, International Edition in English, Vol. 28, No. 3 (March 1989), pp. 253–267).

SUMMARY OF THE INVENTION

It has been found that the solubility of the foregoing class of aramid polymers can be improved by the incorporation in the aramid polymer of an effective amount of a bis(aminophenoxyphenyl) phosphine oxide component for such an effect.

DETAILED DESCRIPTION OF THE INVENTION

The aramid polymers to which the present invention is applicable embraces those aramid polymers known to persons of ordinary skill in the art as derivable from aromatic diamines, such as the phenylene diamines (e.g., p-phenylene diamine) and aromatic diacid chlorides (e.g., the phthaloyl chlorides, such as terephthaloyl chloride). Representative diamines can have the general structure $H_2NRNH_2$ where R can be phenyl (Ar), Ar—O—Ar, or Ar—$SO_2$—Ar. The aromatic diacid chloride can be ClC(O)ArC(O)Cl. It is well within the skill in the art for the person of ordinary skill in the art to select appropriate diamine and diacid chloride reagents and polymerization systems with which the present invention might be used.

The instant invention relies upon use of a bis(aminophenoxyphenyl) phosphine oxide reagent (such as bis(3-aminophenoxy-4'-phenyl) phenylphosphine oxide, hereinafter abbreviated "BAPPO" to enhance the solubility and flame retardancy of the resulting aramid polymer containing a polymeric backbone moiety derived from it. This type of monomer has been discussed for use in polyimide synthesis (see British Pat. No. 1,030,026 and Hergenrother et al., J. Polym. Sci.: Part A: Polymer Chemistry, Vol. 27, 1161–1174 (1989)). The aforementioned type of phosphine oxide moiety can be advantageously incorporated in the aramid polymer using conventional solution polymerization techniques (e.g., one using N-methyl pyrrolidinone containing a small amount (8% or so) of calcium chloride). The amount of aforementioned phosphine oxide solubility enhancing additive can be used in amounts that can be very widely varied (e.g., about 5 mole % to 90 mole % based on the molar amount of the diamine component).

The instant Examples illustrate certain embodiments of the instant invention.

EXAMPLE 1

An aramid was prepared by the following method. Bis(3-aminophenoxy-4'-phenyl) phenylphosphine oxide (m-BAPPO) and p-phenylene diamine (PPD) were charged together in N-methyl pyrrolidinone with 8% $CaCl_2$ (w/v). The resulting composition was allowed to stir under nitrogen with a mechanical stirrer for fifteen minutes. The solution was then cooled to 10° C. in an ice bath. Terephthaloyl chloride (TC) was then added rapidly while the solution was stirred. The reaction was allowed to come to room temperature and was stirred for eight hours. The concentration of the solution was 11% solids (w/w). The reaction mixture was precipitated in 8 volumes of methanol by dropwise addition into a high speed blender. The precipitate was filtered, collected, and then dried in a vacuum oven at 150° C. The yield was quantitative.

Inherent viscosity measurements were performed at 25° C. on 0.5% (w/w) sulfuric acid solutions using a Canon-Ubbelohde viscometer.

A DuPont 912 Differential scanning calorimeter with a 2100 thermal analyzer was used to determine the glass transition temperature (Tg). The scans were run at 10° C. $min^{-1}$.

Thermal gravimetric analysis (TGA) were performed on the same DuPont analyzer. Scans were run at 10° C. $min^{-1}$ in air and nitrogen atmospheres.

| Polyamide (TC and Mol %) | Inherent visc.* | Tg (°C.) | T5%WL $N_2$ | T5%WL Air |
|---|---|---|---|---|
| 100 m-BAPPO | 0.447 | 264 | 471 | 460 |
| 67 m-BAPPO/33 PPD | 0.488 | 277 | 464 | 455 |
| 50 m-BAPPO/50 PPD | 0.697 | | 473 | 464 |
| 33 m-BAPPO/67 PPD | 0.698 | | 493 | 471 |

*on 0.5% sulfuric acid solutions.
T5%WL = temperature at which 5% weight loss is observed.
m-BAPPO = bis(3-aminophenoxy-4'-phenyl) phenyl phosphine oxide.
PPD = p-phenylene diamine.
TC = terephthaloyl chloride.

The m-BAPPO/PPD aramids which contained 67% and 100% BAPPO are soluble in dimethyl acetamine (DMAc), dimethyl sulfoxide (DMSO), and N-methylpyrrolidinone (NMP). The aramids containing 50% and 33% m-BAPPO are soluble only in NMP with $CaCl_2$.

EXAMPLE 2

Listed below are the viscosity and thermal data for various m-BAPPO-oxydianiline (ODA) terephthaloyl based aramids synthesized using the general process shown in Example 1.

| Polyamide (TC and Mol %) | Inherent visc.* | Tg (°C.) | T5%WL $N_2$ | T5%WL Air |
|---|---|---|---|---|
| 67 m-BAPPO/33 ODA | 0.527 | 285 | 482 | 457 |
| 50 m-BAPPO/50 ODA | 0.465 | 309 | | |
| 33 m-BAPPO/67 ODA | 0.744 | | | 469 |

ODA = 4,4'-oxydianiline

The m-BAPPO/ODA aramids consisting of 50% m-BAPPO and greater, were soluble in dimethylacetamine (DMAc), dimethyl sulfoxide (DMSO), and N-methyl pyrrolidinone (NMP). The aramid of 33% m-BAPPO composition was only slightly soluble in these solvents.

EXAMPLE 3

This Example illustrates the use of terephthalic acid in the synthesis of a phosphorus-containing soluble polyaramide in accordance with the present invention.

The polymer was synthesized according to the general method described by Yamazaki et al. in J. Polym. Sci., Polym. Chem. Ed., 1974, 12: 2149 and 1975, 13: 1373. A mixture of terephthalic acid (TA) (1.66 g, 10 mmol), m-BAPPO (4.92 g, 10 mmol), lithium chloride (1.0 g), triphenyl phosphite (5.3 mL), pyridine (5 mL), and NMP (20 mL) was heated to 100° C. for three hours under nitrogen. When cooled, the reaction mixture was poured into methanol (700 mL), and the precipitated polymer was filtered. The polymer was purified by redissolving in DMF and reprecipitation in methanol, and dried in vacuo at 100° C. for forty-eight hours. The procedure yielded 6.2 g (100%) of a white fibrous polymer.

Characterization a. Solubility: The polyaramide based on m-BAPPO and TA was soluble in aprotic polar solvents such as DMF, DMSO, dimethylacetamide (DMAc), and NMP at room temperature, but it was not soluble in common organic solvents such as THF, acetone, chloroform, and so on.

b. Intrinsic viscosity: The polymer showed an intrinsic viscosity of 0.74 dL/g at 25° C. in DMF.

c. Molecular weight and molecular weight distribution: Gel permeation chromatography of the title polyaramide with comparison to polystyrene standard in NMP/LiBr solution at 60° C. gave $Mn = 154 \times 10^3$ and $Mw = 441 \times 10^3$ with a polydispersity $Mw/Mn = 2.86$.

Low angle light scattering (LALLS) of the polymer in DMF gave a molecular weight (Mw) of $191 \times 10^3$.

d. Solid state properties: The polymer was white and fibrous and it formed a transparent and tough flexible film from solution.

e. Thermal properties: The aromatic polyamide based on m-BAPPO and TA showed quite high thermal stability. The glass transition temperature (Tg) was 258° C. (10° C./min), and thermal gravimetric analysis (TGA) showed 5% weight loss (10° C./min) at 464° C. in air. The polymer was amorphous, and the DSC trace did not show any melting transition up to 450° C.

f. Spectroscopic data: IR (KBr pellet) 3300 (N—H), 1669 (C=O), 1607, 1587, and 1539 (C=C), 1436 (At—P), 1260 (At—O—Ar), and 1170 (P=O) cm$^{-1}$; $^1$H NMR (DMSO-d$_6$/TMS) δ10.48 (2H, s, NH), 8.01 (4H, s, H, aromatic from TA) and 7.7–6.8 (21H, m, H, aromatic from m-BAPPO).

This direct polycondensation method using triphenyl phosphite and lithium chloride in NMP/pyridine solution is an effective way to make the aramid polymers claimed herein and is a more simplified synthesis which uses the aromatic diacid and diamine directly as starting materials.

The foregoing Examples should not be construed in a limiting sense since they merely describe certain embodiments of the instant invention. The scope of protection sought is set forth in the claims which follow.

We claim:

1. An aramid polymer which contains an effective amount of a moiety derived from bis(3-aminophenoxy-4'-phenyl)phenylphosphine oxide.

2. An aramid polymer as claimed in claim 1, which is formed by reaction of a phenylene, the phosphine oxide, diamine and an aromatic diacid chloride.

3. An aramid polymer as claimed in claim 1 which is formed by reaction of p-phenylene diamine, the phosphine oxide and terephthaloyl chloride.

* * * * *

UNITED STATES PATENT AND TRADEMARK OFFICE
CERTIFICATE OF CORRECTION

PATENT NO. : 5,420,225
DATED : May 30, 1995
INVENTOR(S) : Attila Gungor, et al.

It is certified that error appears in the above-identified patent and that said Letters Patent is hereby corrected as shown below:

Col. 4, line 14, "(At-P)" and "At-O-Ar)", respectively, should read -- (Ar-P) -- and -- (Ar-O-Ar); and Col. 4, line 33, insert -- diamine -- immediately after "phenylene" before the comma (,); and Col. 4, line 34, delete "diamine".

Signed and Sealed this

Fifth Day of March, 1996

Attest:

BRUCE LEHMAN

Attesting Officer     Commissioner of Patents and Trademarks